(12) United States Patent
Köehler

(10) Patent No.: US 7,422,195 B2
(45) Date of Patent: Sep. 9, 2008

(54) ROPE TENSIONING DEVICE FOR THREE-DIMENSIONAL NETS OF THREE-DIMENSIONAL FRAMEWORKS

(75) Inventor: Karl-Heinz Köehler, Berlin (DE)

(73) Assignee: UDB Urban Design Berlin GmbH, Berlin (DE)

( * ) Notice: Subject to any disclaimer, the term of this patent is extended or adjusted under 35 U.S.C. 154(b) by 259 days.

(21) Appl. No.: 10/502,721

(22) PCT Filed: Jan. 31, 2003

(86) PCT No.: PCT/EP03/01048

§ 371 (c)(1),
(2), (4) Date: Feb. 7, 2005

(87) PCT Pub. No.: WO03/063968

PCT Pub. Date: Aug. 7, 2003

(65) Prior Publication Data

US 2005/0133771 A1 Jun. 23, 2005

(30) Foreign Application Priority Data

Feb. 1, 2002 (DE) ................................. 102 04 797

(51) Int. Cl.
*B21F 9/00* (2006.01)
(52) U.S. Cl. .................................... 254/234; 254/231

(58) Field of Classification Search ................ 254/231, 254/234
See application file for complete search history.

(56) References Cited

U.S. PATENT DOCUMENTS

| | | | | |
|---|---|---|---|---|
| 1,276,702 A * | 8/1918 | Anderson | .................... | 24/71.1 |
| 1,965,899 A * | 7/1934 | Lambert | .................... | 254/234 |
| 2,525,382 A * | 10/1950 | Trees | .................... | 254/231 |
| 3,591,215 A * | 7/1971 | Frost et al. | .................... | 403/396 |
| 3,912,854 A * | 10/1975 | Thompson et al. | ........ | 174/88 C |
| 4,223,869 A * | 9/1980 | Patterson et al. | ........ | 24/68 CD |
| 4,700,434 A * | 10/1987 | Fambrough | .............. | 242/388.2 |
| 4,815,408 A * | 3/1989 | Burd | ........................... | 114/109 |
| 5,684,274 A * | 11/1997 | McLeod | ....................... | 174/92 |
| 5,716,084 A * | 2/1998 | Sanford et al. | ............. | 292/264 |
| 6,102,837 A * | 8/2000 | Hubbard | ..................... | 482/120 |
| 6,523,558 B1 * | 2/2003 | Gillis | ........................... | 135/87 |
| 6,866,296 B2 * | 3/2005 | Webber et al. | .............. | 280/806 |

* cited by examiner

*Primary Examiner*—Emmanuel M Marcelo
(74) *Attorney, Agent, or Firm*—Christa Hildebrand; Norris McLaughlin & Marcus, PA

(57) ABSTRACT

This object is achieved by a rope tightening device for space defining nettings of a three-dimensional framework wherein rope parts of the space defining nettings are connected to the junction point members of a supporting frame to which frame the space defining netting is attached, the rope tightening device according to the present invention being characterized in that a rope receiving part (6, 6*a*) is arranged, by means of a tightening screw (10), on an inner surface or an outer surface of a hollow junction point member (1) or on an outer surface of a solid junction point member, respectively, wherein said rope receiving part (6, 6*a*) is movable in the direction of the tightening motion, and that the rope parts (3) of the space defining netting which is to be tightened are fixable within the rope receiving part (6, 6*a*).

18 Claims, 6 Drawing Sheets

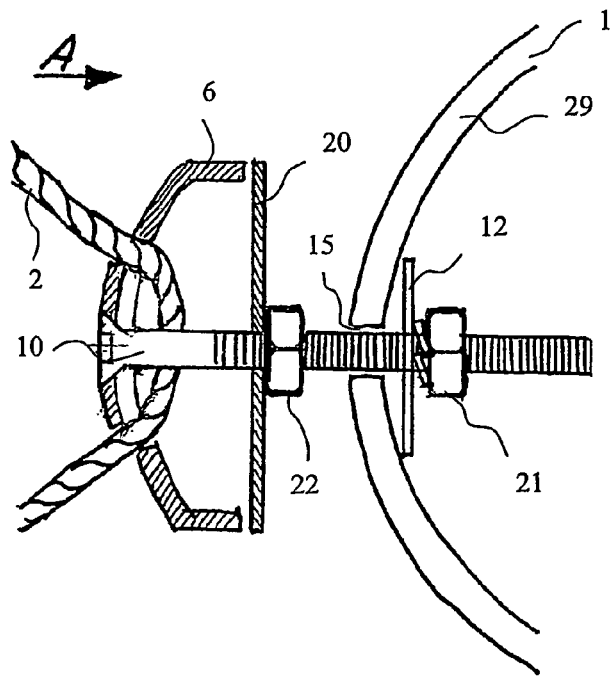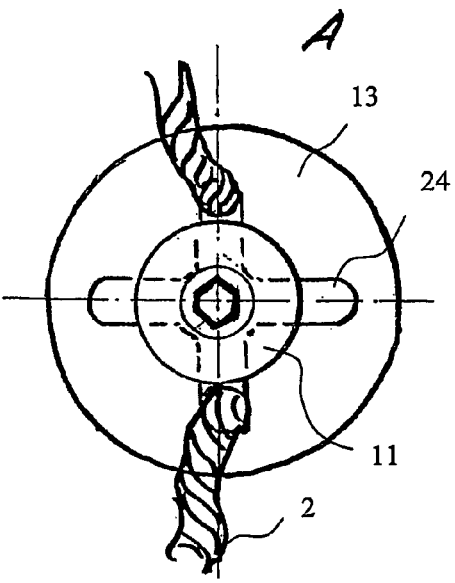
Fig.6  Fig.7
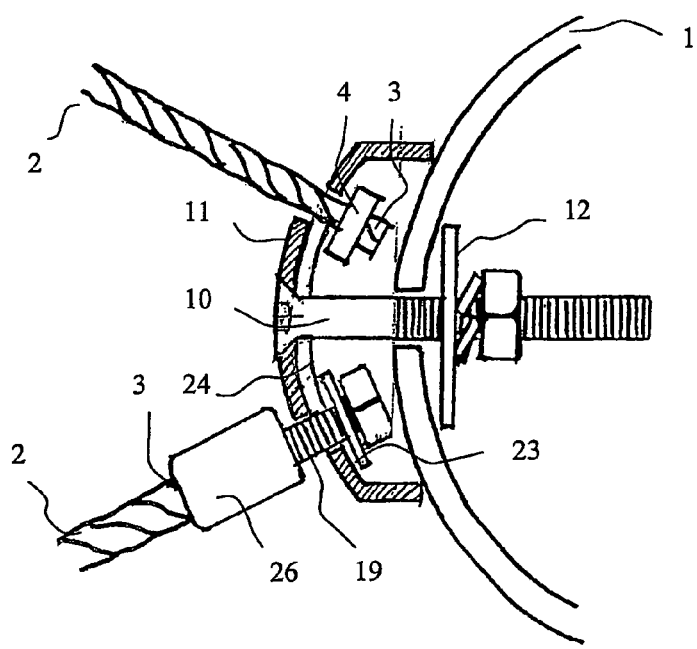
Fig.8

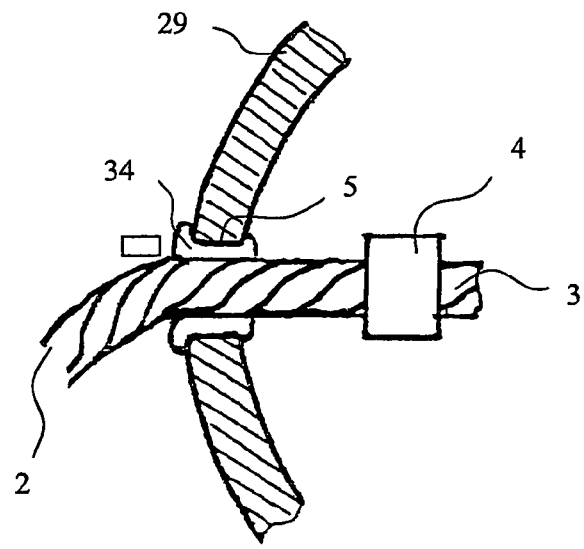
Fig.12
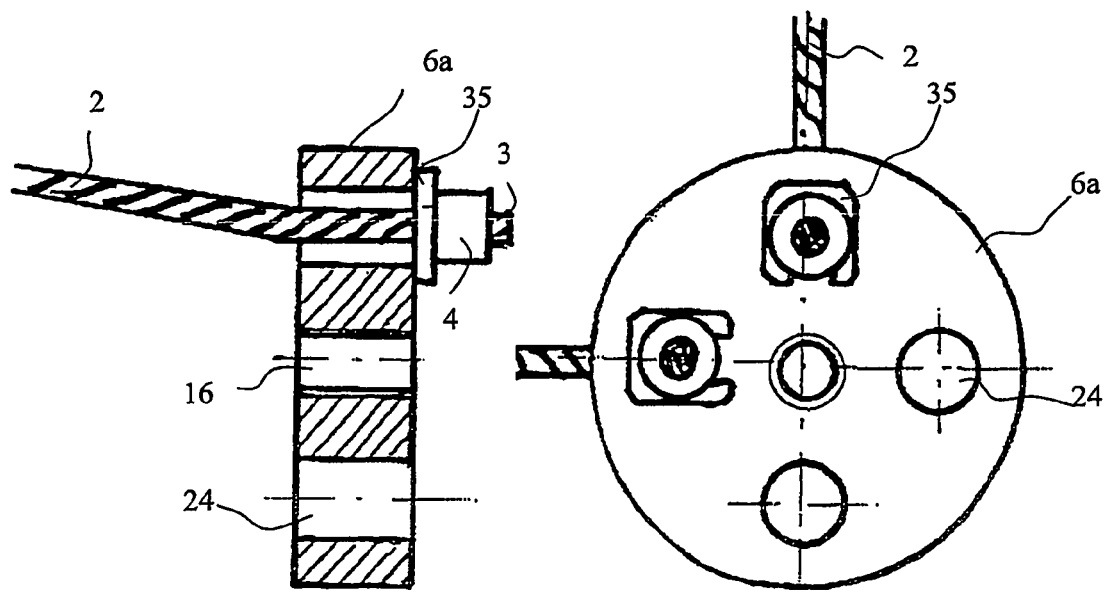
Fig.13  Fig.14

ROPE TENSIONING DEVICE FOR THREE-DIMENSIONAL NETS OF THREE-DIMENSIONAL FRAMEWORKS

The present invention relates to a rope tightening device for space defining nettings of three-dimensional frameworks. The space defining nettings is stabilized by means of supporting frames, wherein rope parts are connected to junction point members of the supporting frame.

Space defining nettings made up of rope nettings and combined with variable supporting frame systems have turned out to be particularly successful elements in the designing of playgrounds. By using these space defining nettings, various playing environments can be created in connection with three-dimensional structures, thus promoting children's physical exercise.

The space defining nettings made up of interconnected ropes are tightened within a predetermined supporting frame system wherein a high degree of flexibility of the supporting frames can be achieved by interconnecting individual supporting frame rods by means of spherical hollow bodies, thus being able to create many interesting geometrical shapes. The space defining nettings are then attached and tightened within said supporting frames by attaching them to the spherical hollow bodies and rods.

Thus, for the purpose of tightening the space defining nettings, it is known to press the rope ends to form eyelets and connect them individually or in groups by means of shackles via a tightening screw to the spherical hollow bodies, i.e. the so-called junction point members of the outer supporting frame structure where they are tightened. The proper tightening of the nettings is necessary in order to prevent the ropes from fraying out at their attachment and crossing points.

On the one hand, the method of attaching and tightening the space defining nettings by means of shackles and tightening screws can result, in the worst case, in playing children getting caught, mostly with their fingers, in the openings and gaps which emerge in the eyelets, between the ropes, and in the attachment elements. On the other hand, this method of attachment, due to the inevitable structural length of the used elements, results in the loss of space at the supporting frame which could otherwise be used for playing. Moreover, this way of attachment is optically unsuitable for a device which children use for playing.

It is therefore the object of the present invention to propose a rope tightening device for space defining nettings used by children for playing which is practically invisible in the playing areas within said three-dimensional frameworks, thus being able to avoid the risk of injuries without affecting the tightening of the nettings.

This object is achieved by, by providing a rope receiving part which is arranged by means of a tightening screw on a surface of a junction point member. The rope receiving part is movable in the direction of the tightening motion. The tone parts of the space defining netting are fixable within the rope receiving part. Advantageous embodiments are include a rope receiving part shaped as a spherical-cap which comprises a spherical retaining cap with a hollow-cylindrical side wall. The spherical retaining cap may be concave or convex or plain. The spherical retaining cap may also comprises side slots. The spherical retaining cap may also comprise an axial bore with an internal thread in which an axial bore and the tightening screw is arranged. The axial bore is extended by means of an adapter sleeve, The spherical retaining cap may also comprise internal slots. A covering disk is connected to a screw head of the tightening screw. Also, a tension plate and a tension nut are arranged on the external thread of the tightening screw.

The spherical-cap shaped rope receiving part is coverable by means of a covering cap which is arranged on the tightening screw. The compact rope receiving part is configured as a compact, moulded solid part. The compact rope receiving part comprises recesses. The axial bore of the compact rope receiving part comprises an internal thread. The tightening screw comprises a guide pin which is guided in a pin bore in the wall of the junction point member. The tightening screw is supported by means of an internal guide which is attached to the inner surface of the hollow junction point member. The compact rope receiving part (6a) may also include side slots. The compact rope receiving part comprises internal slots which are configured as bores if necessary. The flanged sleeves are inserted into the rope openings of the wall of the junction point member. The rope part of the rope comprises a retaining part in addition to the enlargement. In the event the junction point member is configured as a solid body, the tightening screw is only screwably arranged in the screw bore.

Thus, there is indicated a rope tightening device for space defining nettings of a three-dimensional framework wherein rope parts of the space defining nettings are connected to the junction point members of a supporting frame to which frame the space defining netting is attached, the rope tightening device according to the present invention being characterized in that a rope receiving part is arranged, by means of a tightening screw, on an inner surface or an outer surface of a hollow junction point member or on an outer surface of a solid junction point member, respectively, wherein said rope receiving part is movable in the direction of the tightening motion, and that the rope parts of the space defining netting which is to be tightened are fixable within the rope receiving part.

In a preferred embodiment of the rope tightening device according to the present invention, a spherical-cap shaped rope receiving part comprises, according to the present invention, a spherical retaining cap with a hollow-cylindrical side wall. The spherical retaining cap is concave or convex or plain. The spatial surface design of the spherical retaining cap particularly depends on the required direction of the tightening motion in connection with the design of the outer and inner surfaces, respectively, of the junction point member. The compact rope receiving part comprises at least one side slot where a rope part comprising an enlargement can be inserted and fixed. The arrangement of multiple side slots provides the possibility of fixing multiple enlarged rope ends. An internal thread of an axial bore in the spherical retaining cap of the spherical-cap shaped rope receiving part enables a tightening screw to be screwed in. The rope tightening device can be placed in the hollow junction point member. Advantageously, a partially spherical retaining cap of the spherical-cap shaped rope receiving part is provided in connection with a spherical junction point member. The rope parts of the space defining netting are put through bores in the wall of the junction point member and fixed in the side slots of the compact rope receiving part. The fixed rope parts are tightened in a direction opposite to the screwing direction by means of the tightening screw which can be screwed against the inner surface of the junction point member in a preferred embodiment of the tightening device. The enlargements of the rope parts can be attached in a manner which is known per se.

In another advantageous embodiment, the rope tightening device is arranged on the outside of the hollow junction point member. In this embodiment, the slots are configured as internal slots on the spherical retaining cap. Said slots provide the possibility of fixing both rope parts with enlargements and continuous ropes. By means of a covering disk which is connected to the head of the tightening screw or inserted into a corresponding bore, the internal slots are covered to such an extent that the rope parts or the continuous ropes, respectively, are prevented from slipping out. Here, the tightening screw is screwed with its external thread into a corresponding bore in the wall of the hollow junction point member. The fixed rope parts or continuous ropes, respectively, can now be tightened inside the junction point member to the required extent by means of a tension nut and a tension plate, said tension plate being pressed against the inner surface of the hollow junction point member.

In one embodiment of the present invention, the spherical-cap shaped rope receiving part arranged on the outside can be covered on its open side by means of a covering cap. This embodiment is particularly suitable in situations in which the use of a particularly long tightening screw is required for technical reasons and the occurrence of injury-causing openings in the side receiving part must be prevented.

In another advantageous embodiment of the rope tightening device according to the present invention, a rope receiving part is configured as a compact, moulded solid rope receiving part. This configuration of the rope receiving part has turned out to be particularly advantageous at the occurrence of particularly high tension forces. For the purpose of adaptation to the shape of the respective junction point member, the outer surfaces of the rope receiving part can be concave or convex or plain. For the purpose of providing a particularly secure attachment of the rope parts in the rope receiving part, the side slots as well as the internal slots comprise recesses which receive the enlargements of the rope. The axial bore of the compact rope receiving part can comprise a thread in which the tightening screw, for the purpose of tightening the ropes, can be screwed in or out, respectively. In this connection, there are advantageously provided a guide pin of the tightening screw, said guide pin being supported in a pin bore and in a retaining plate, and an internal guide of the tightening screw in the event of the junction point member being configured as a hollow body. The internal slots of the rope receiving part can be configured as bores.

It has turned out to be suitable to insert flanged sleeves into the rope openings of the wall of the hollow junction point member after inserting the enlarged rope parts, said flanged sleeves being adapted to reduce the distance between the rope and the wall of the rope opening and, in addition to that, to prevent the rope from being damaged by avoiding contact between the rope and the edges of the rope openings.

In order to prevent the enlarged rope parts from slackening in the rope receiving part, another embodiment of the present invention provides an additional retaining part by means of which a further enlargement of the rope part is achieved.

In the embodiment providing a solid-body junction point member, the tightening screw is only screwably arranged in the screw bore. The depth of the screw bore is defined by the size of the solid layer.

The invention will now be described in greater detail with reference to the accompanying drawings in which:

FIG. 6 is a diagrammatic section of a rope tightening device arranged outside the junction point member, said rope tightening device comprising an additional covering cap;

FIG. 7 is a diagrammatic view of a covering disk of the rope tightening device arranged outside the junction point member;

FIG. 8 is a diagrammatic section of a rope tightening device arranged outside the junction point member, said rope tightening device comprising enlarged rope parts;

FIG. 12 is a diagrammatic section of the arrangement of a flanged sleeve in the wall of a junction point member;

FIG. 13 is a diagrammatic view of an enlarged rope part comprising a retaining part;

FIG. 14 is a diagrammatic top view of a compact rope receiving part with additional retaining parts.

The following exemplary descriptions with reference to the drawings serve to illustrate the embodiments of the rope tightening device according to the present invention.

Figures 1, 2:
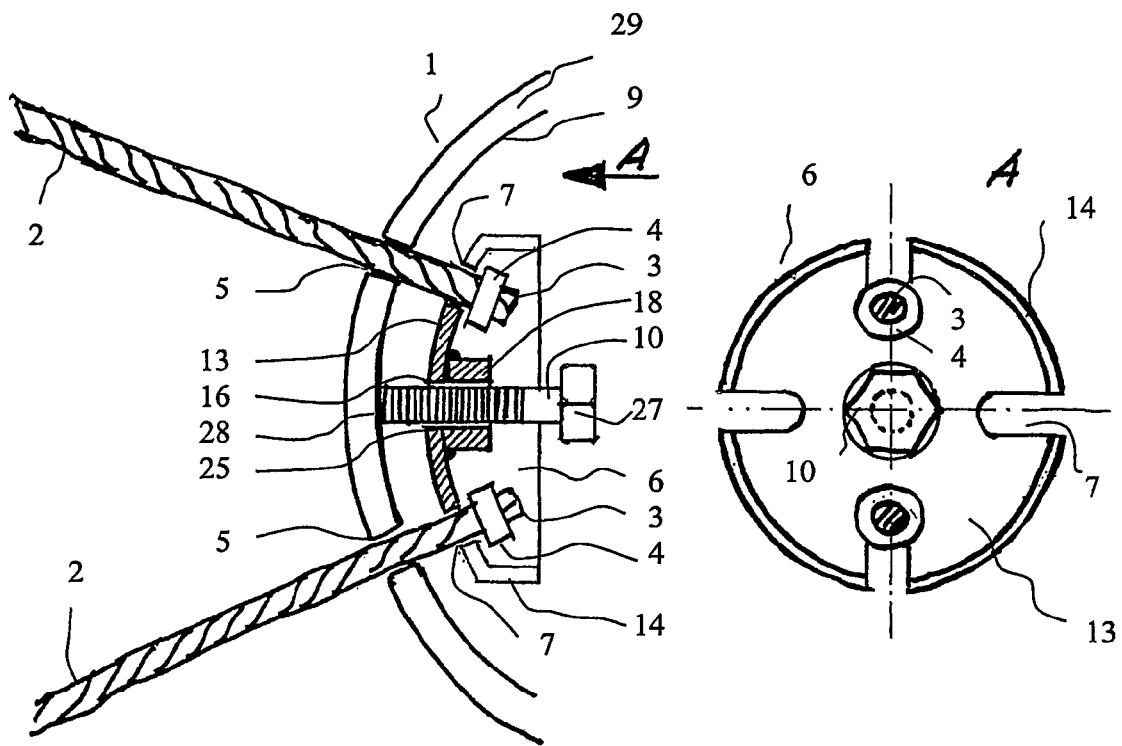
FIG. 1 is a diagrammatic section of a rope tightening device arranged inside the hollow junction point member.
FIG. 2 is a diagrammatic top view of the rope tightening device arranged inside the hollow junction point member.

FIG. 1 indicates a hollow junction point member 1. Circular or slot-shaped rope openings 5 are provided in a wall 29 of the junction point member 1. Ropes 2 are inserted into the rope openings 5. The ropes 2 are fixed at rope parts 3 in a spherical-cap shaped rope receiving part 6, said rope parts comprising enlargements 4. The enlargements 4 of the rope parts 3 prevent the rope parts from slipping out of side slots 7 arranged in a side wall 14 and in a spherical retaining cap 13 of the spherical-cap shaped rope receiving part 6.

FIG. 2 shows the exemplary configuration of the side slots 7 in the spherical retaining cap 13 of the spherical-cap shaped rope receiving part 6. A tightening screw 10 can be screwed into an axial bore 16 comprising an internal thread 25. The axial bore 16 comprising an internal thread 25 can be extended by means of an adapter sleeve 18, if necessary. The screw tip 28 of the tightening screw 10 can be screwed against an inner surface 9 of the hollow junction point member by means of a hexagon screw head 27 whereby the rope receiving part 6 is moved in a direction opposite to the moving direction of the bolt, i.e. toward the centre of the junction point member 1. As a result of this, the ropes 2 are tightened because they are clamped in the side slots 7 due to the enlargements 4 of the rope parts 3.

Figure 3:
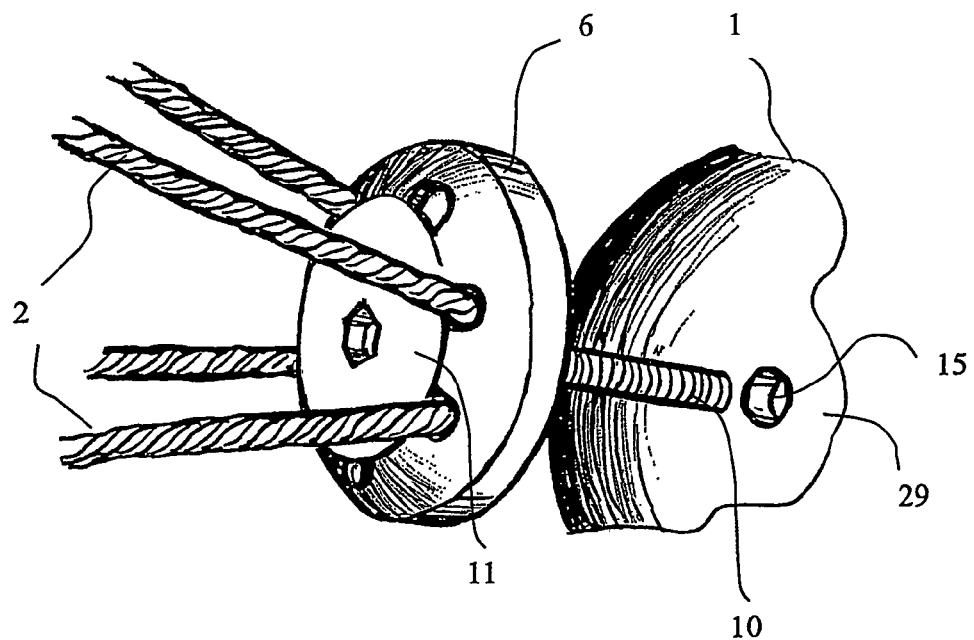
FIG. 3 is a diagrammatic perspective view of a rope tightening device arranged outside the hollow junction point member.

FIG. 3 illustrates a rope tightening device according to the present invention which is arranged outside the hollow junction point member 1. This perspective view shows that the tightening screw 10 is inserted into a screw bore 15 in the wall 29 of the hollow junction point member 1. Four ropes 2 are fixed in the spherical-cap shaped rope receiving part 6 by means of a covering disk 11.

Figure 4:
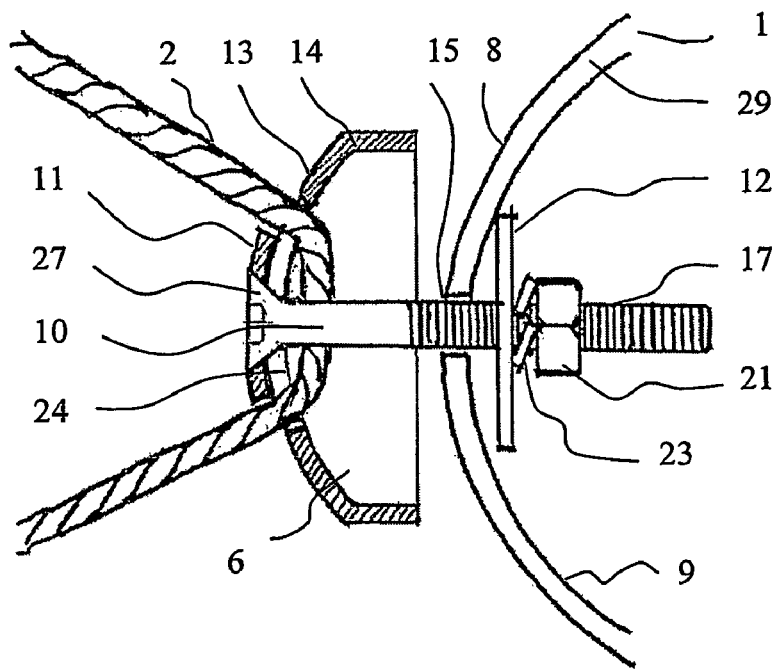
FIG. 4 is a diagrammatic section of a rope tightening device arranged outside the junction point member.

FIG. 4 is a diagrammatic section of the rope tightening device arranged on the outer surface 8 of the hollow junction point member 1. The wall 29 of the junction point member 1 comprises the screw bore 15 through which the tightening screw 10 is inserted into the inside of the junction point member 1. A continuous rope 2 is arranged within the spherical-cap shaped rope receiving part 6. For this purpose, it was necessary according to the present invention to provide internal slots 24 in the spherical retaining cap 13 of the spherical-cap shaped rope receiving part 6. FIG. 7 illustrates the shape and the arrangement of the internal slots 24.

For the purpose of preventing the inserted rope 2 from slackening, there is provided, according to the present invention, the covering disk 11 which covers a part of the slots 24 in such a way that the rope 2 cannot slacken. The covering disk 11 is connected to the screw head 27 of the tightening screw 10. Inside the junction point member 1, a tension plate 12 and a tension nut 21 are arranged on the external thread 17 of the tightening screw 10, said plate and nut being separated from each other by means of a washer 23. By means of the tension nut 21, the spherical-cap shaped rope receiving part 6 can be pressed tightly onto the outer surface 8 of the junction point member 1, thereby tightening the rope 2.

Figure 5:
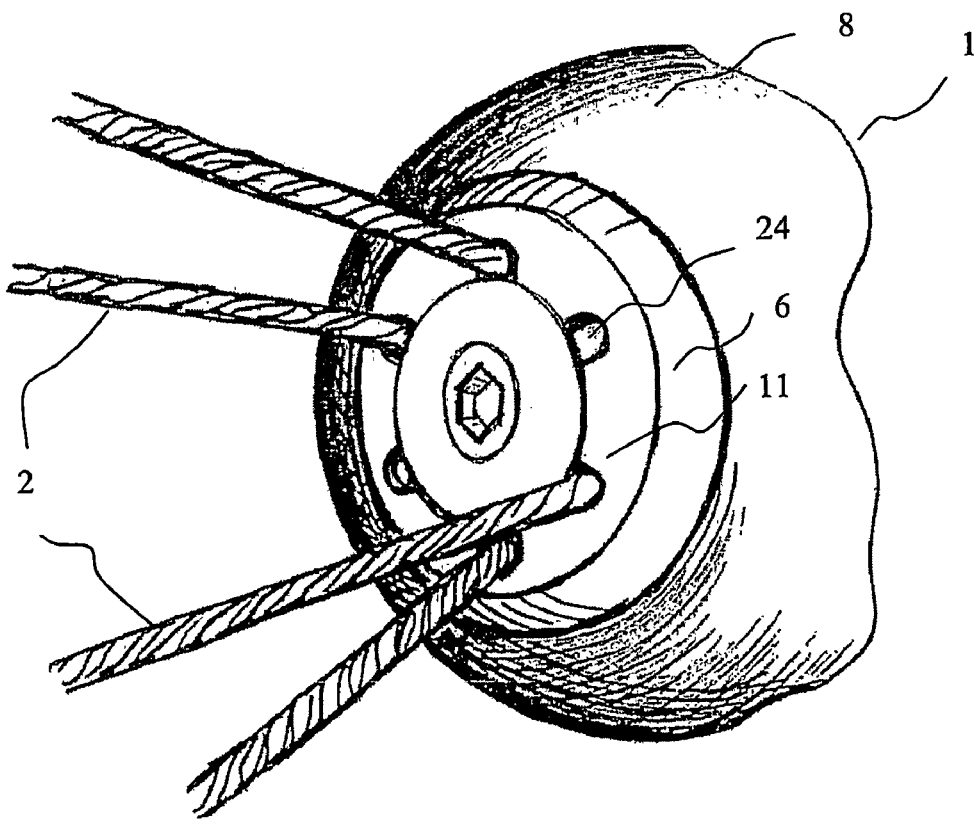
FIG. 5 is a diagrammatic perspective view of a rope tightening device which fits tightly to the junction point member.

FIG. 5 shows the spherical-cap shaped rope receiving part 6 which fits tightly to the outer surface 8 of the junction point member 1.

FIG. 6 shows an exemplary arrangement of an extended tightening screw 10. This arrangement requires the spherical-cap shaped rope receiving part 6 to be covered by means of a covering cap 20 and a covering cap nut 22.

FIG. 8 shows the possibility of fixing rope parts 3 by means of special enlargements 4 in the event of the rope tightening device being attached to the outer surface 8 of the hollow junction point member 1. While the upper rope part has been enlarged by means of an arrangement which is known per se, the lower rope part 3 is provided with a clamping sleeve 26 which comprises an internal thread into which an adjusting screw 19 with a washer 23 can be screwed. Again, the tightening screw 10 is fixed in the internal slot 24 by means of the covering disk 11. The adjusting screw 19 can be used for further tightening of the rope.

Figure 9:
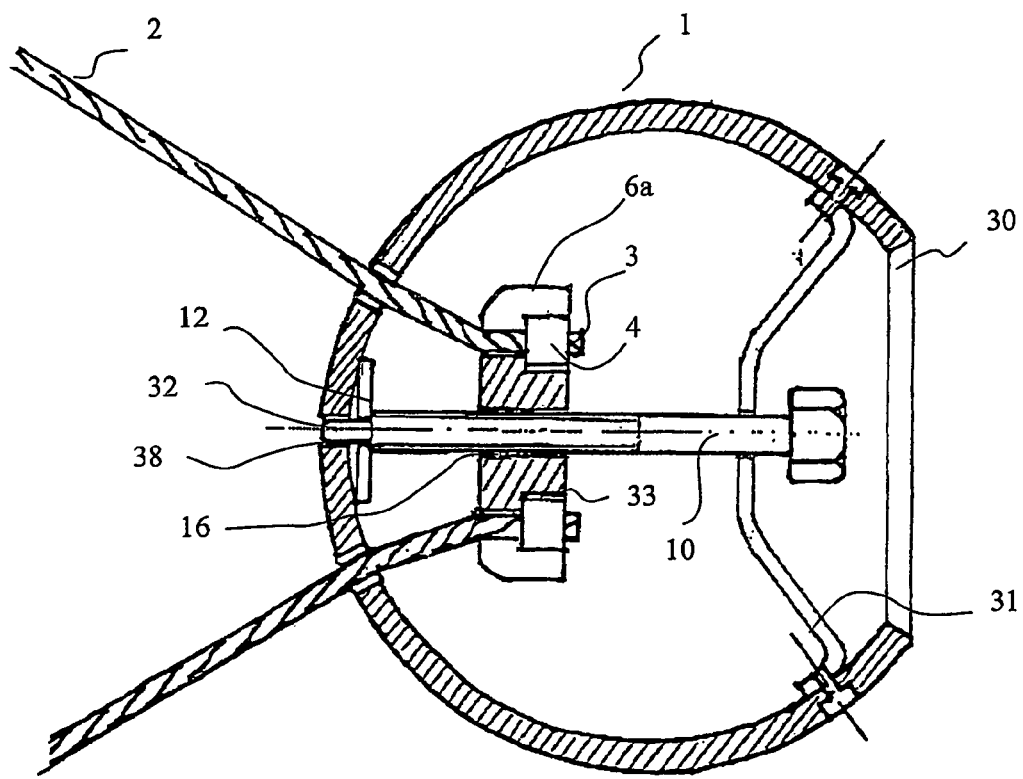
FIG. 9 is a diagrammatic section of the arrangement of a single-piece rope receiving part.

FIG. 9 is a diagrammatic view of an exemplary arrangement of the tightening device according to the present invention with a compact, solid rope receiving part 6a. The tightening device according to the present invention is arranged inside the hollow junction point member 1. An internal guide 31 is attached to the inner surface 9 of the junction point member 1. The internal guide 31 guides the tightening screw 10 which is screwably arranged in the axial bore 16 of the compact rope receiving part 6a. The tightening screw 10 is further guided by means of a guide pin 32 in a pin bore 38. The tightening screw 10 is accessible via a junction point member opening 30. When the tightening screw 10 is screwed into the axial bore 16, the tightening screw 10 presses against the tension plate 12, thus moving the compact rope receiving part 6a in the direction of the tightening motion, thereby tightening the rope 2.

The rope parts 3 with the enlargements 4 are fixed in recesses 33.

Figures 10, 11:
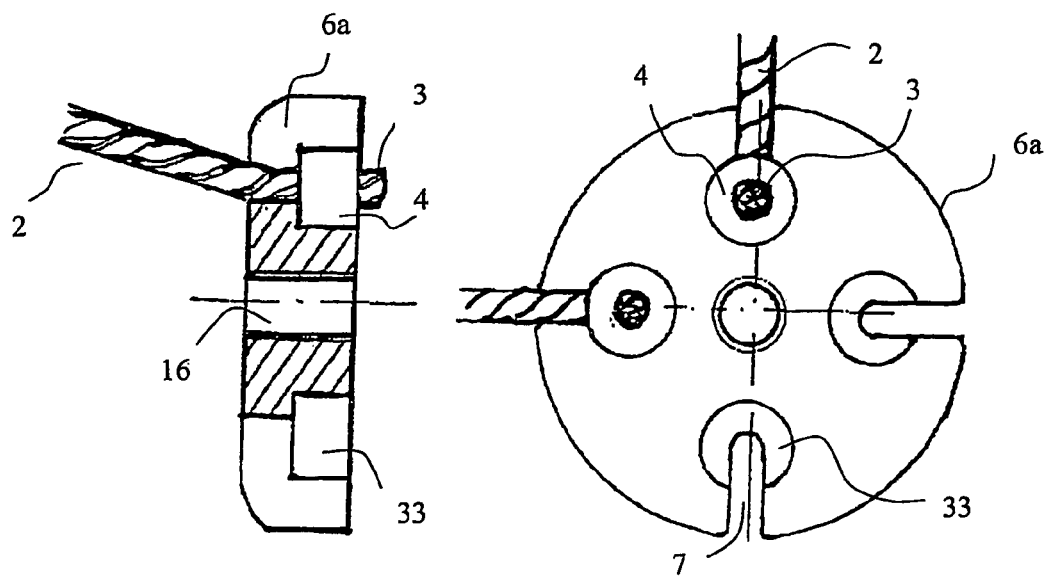
FIG. 10 is a diagrammatic section of the arrangement of the rope parts in recesses.
FIG. 11 is a diagrammatic top view of a single-piece rope receiving part comprising recesses.

The diagrammatic section of FIG. 10 and the diagrammatic top view of FIG. 11 show in detail how the rope parts 3 are fixed in the recesses 33.

The detail in FIG. 12 shows the arrangement of a flanged sleeve 34 in the rope opening 5 of the wall 29. The inner diameter of the rope opening 5 approximately corresponds to the diameter of the enlargement 4 of the rope part 3 which enables the enlargement 4 to be pushed through the rope opening 5. Afterwards, the rope opening 5 is closed by means of the flanged sleeve 34 which is pressed into the rope opening 5. At the same time, this arrangement avoids disadvantageous contact with the wall 29.

The details in FIG. 13 and FIG. 14 representing another advantageous embodiment of the present invention show the use of a retaining part 35 which can be used in addition to the rope enlargement 4 of the rope part 3. This arrangement is particularly advantageous when the diameter of the internal slots 24, which here are configured as bores, approximately corresponds to the diameter of the enlargement 4. By means of the retaining part 35, the rope parts 3 can be fixed on the compact rope receiving part 6a after inserting the rope parts 3 with the enlargement 4 into the internal slots 24.

Figure 15:
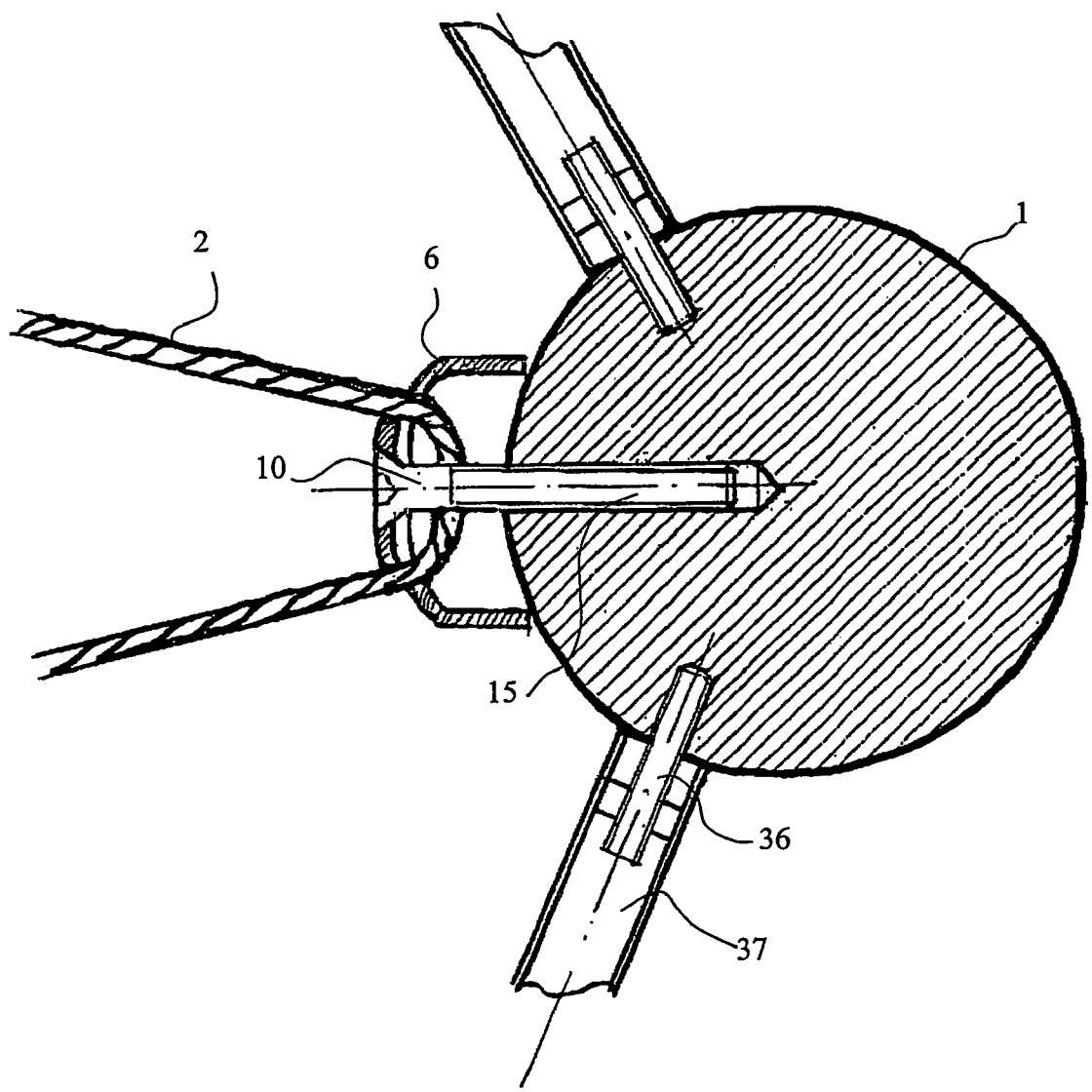
FIG. 15 is a diagrammatic section of a solid junction point member comprising a tightening screw inserted therein.

FIG. 15 shows a solid junction point member 1. By means of a tightening screw 10, a rope receiving part 6 is screwed into a screw bore 15 of the junction point member 1 in such a way that the rope 2 can be tightened. FIG. 15 also shows the arrangement of a supporting frame rod 37 on the junction point member 1 which rod is attached to the junction point member 1 by means of a screwed joint 36.

LIST OF REFERENCE NUMERALS 1 junction point member
2 rope
3 rope part
4 enlargement
5 rope opening
6 spherical-cap shaped rope receiving part
6a compact rope receiving part
7 side slot
8 outer surface
9 inner surface
10 tightening screw
11 covering disk
12 tension plate
13 spherical retaining cap
14 side wall
15 screw bore
16 axial bore
17 external thread
18 adapter sleeve
19 adjusting screw
20 covering cap
21 tension nut
22 covering cap nut
23 washer
24 internal slots
25 internal thread
26 clamping sleeve
27 screw head
28 screw tip
29 wall
30 junction point member opening
31 internal guide
32 guide pin
33 recess
34 flanged sleeve
35 retaining part
36 screwed joint
37 supporting frame rod
38 pin bore

The invention claimed is:

1. A rope tightening device for space defining nettings of a three-dimensional framework which are stabilized by means of a supporting frame, comprising
a junction point member (1) formed as a rounded body,
a rope receiving part (6) for retaining a plurality of rope parts (3),
a tightening screw (10) disposed in the rope receiving part (6) and extending towards the junction point member (1)

such as to displace the rope receiving part (6) against the junction point member (1) so that the plurality of rope parts are tightened.

2. The rope tightening device according to claim 1, wherein the rope receiving part is spherically shaped and comprises side slots (7).

3. The rope tightening device according to claim 2, wherein the rope receiving part comprises internal slots (24).

4. The rope tightening device according to claim 1, wherein the rope receiving part comprises an axial bore (16) with an internal thread (25), in which the tightening screw (10) is screwably arranged.

5. The rope tightening device according to claim 4, wherein the axial bore (16) is extended by an adapter sleeve (18).

6. The rope tightening device according to claim 4, wherein the axial bore (16) of the compact rope receiving part (6a) comprises an internal thread (25).

7. The rope tightening device according to claim 4, wherein the tightening screw comprises a guide pin (32) which is guided in a pin bore (38) in a wall (29) of the junction point member.

8. The rope tightening device according to claim 7, wherein flanged sleeves (34) are inserted into a rope opening (5) of the wall of the junction point member.

9. The rope tightening device according to claim 1, wherein the tightening screw has a screw head (27) and wherein a covering disk (11) is associated with the screw head (27).

10. The rope tightening device according to claim 1, further comprising a tension plate (12) disposed around the tightening screw, held in position by a nut (21).

11. The rope tightening device according to claim 1, wherein the rope receiving part (6) includes a covering cap (20) arranged on the tightening screw.

12. The rope tightening device according to claim 1, wherein the compact rope receiving part comprises recesses (33).

13. The rope tightening device according to claim 1, wherein the tightening screw (10) is supported by an internal guide (31) attached to an inner surface (9) of the junction point member (1).

14. The rope tightening device according to claim 1, wherein the rope receiving part comprises side slots (7).

15. The rope tightening device according to claim 1, wherein the rope receiving part comprises internal slots (24).

16. The rope tightening device according to claim 1, wherein the rope receiving part comprises internal bores.

17. The rope tightening device according to any one of claim 1, wherein the rope part (3) comprises a retaining part (35) in addition to an enlargement (4).

18. The rope tightening device according to claim 1, wherein the junction point member (1) is configured as a solid body and wherein the tightening screw (10) is screwably arranged in a screw bore (15).

* * * * *